(12) United States Patent
Harstad et al.

(10) Patent No.: US 6,945,382 B2
(45) Date of Patent: Sep. 20, 2005

(54) GATE ASSEMBLY

(75) Inventors: Denerd Harstad, Waitsburg, WA (US);
James Ruff, Walla Walla, WA (US);
Larry Mahanna, Weston, OR (US)

(73) Assignee: Key Technology, Inc., Walla Walla, WA (US)

( * ) Notice: Subject to any disclaimer, the term of this patent is extended or adjusted under 35 U.S.C. 154(b) by 36 days.

(21) Appl. No.: 10/638,212

(22) Filed: Aug. 7, 2003

(65) Prior Publication Data

US 2005/0040008 A1 Feb. 24, 2005

(51) Int. Cl.$^7$ ................................................ B65G 37/00
(52) U.S. Cl. ................................ 198/360; 198/370.01
(58) Field of Search ............................ 198/360, 370.01

(56) References Cited

U.S. PATENT DOCUMENTS

| | | | | |
|---|---|---|---|---|
| 2,776,741 A | * | 1/1957 | Carrier, Jr. ................. | 198/359 |
| 3,346,092 A | * | 10/1967 | Bowden et al. .......... | 198/860.4 |
| 4,023,673 A | * | 5/1977 | Hansen ..................... | 198/735.4 |
| 4,058,199 A | * | 11/1977 | Schlagel ................... | 198/359 |
| 4,715,950 A | | 12/1987 | Danner et al. | |
| 5,183,143 A | * | 2/1993 | Sullivan, Jr. ............... | 198/359 |
| 5,555,967 A | * | 9/1996 | Hufford ..................... | 198/359 |
| 6,059,094 A | * | 5/2000 | Swanstrom et al. ..... | 198/735.4 |
| 6,119,849 A | * | 9/2000 | Svejkovsky et al. ..... | 198/860.4 |
| 6,235,998 B1 | * | 5/2001 | Brewer ..................... | 177/103 |
| 6,276,518 B1 | | 8/2001 | Wierman | |
| 6,286,665 B1 | | 9/2001 | Svejkovsky et al. | |
| 6,378,688 B1 | * | 4/2002 | Fitzgerald et al. ...... | 198/370.01 |
| 6,505,727 B2 | | 1/2003 | Schroeder et al. | |
| 6,691,853 B1 | * | 2/2004 | Basketfield ................ | 198/360 |
| 2002/0088694 A1 | | 7/2002 | Thompson et al. | |

FOREIGN PATENT DOCUMENTS

WO    WO 02/060791    8/2002

* cited by examiner

*Primary Examiner*—Douglas Hess
(74) *Attorney, Agent, or Firm*—Wells St. John P.S.

(57) ABSTRACT

A gate assembly for use with a conveying surface which has an aperture formed therein is disclosed, and which includes a moveable gate plate which is operable to selectively occlude the aperture; and first and second chutes which are borne by the moveable gate plate and which move therewith, and which are individually operable to receive and carry away an article which passes through the aperture of the conveying surface.

26 Claims, 6 Drawing Sheets

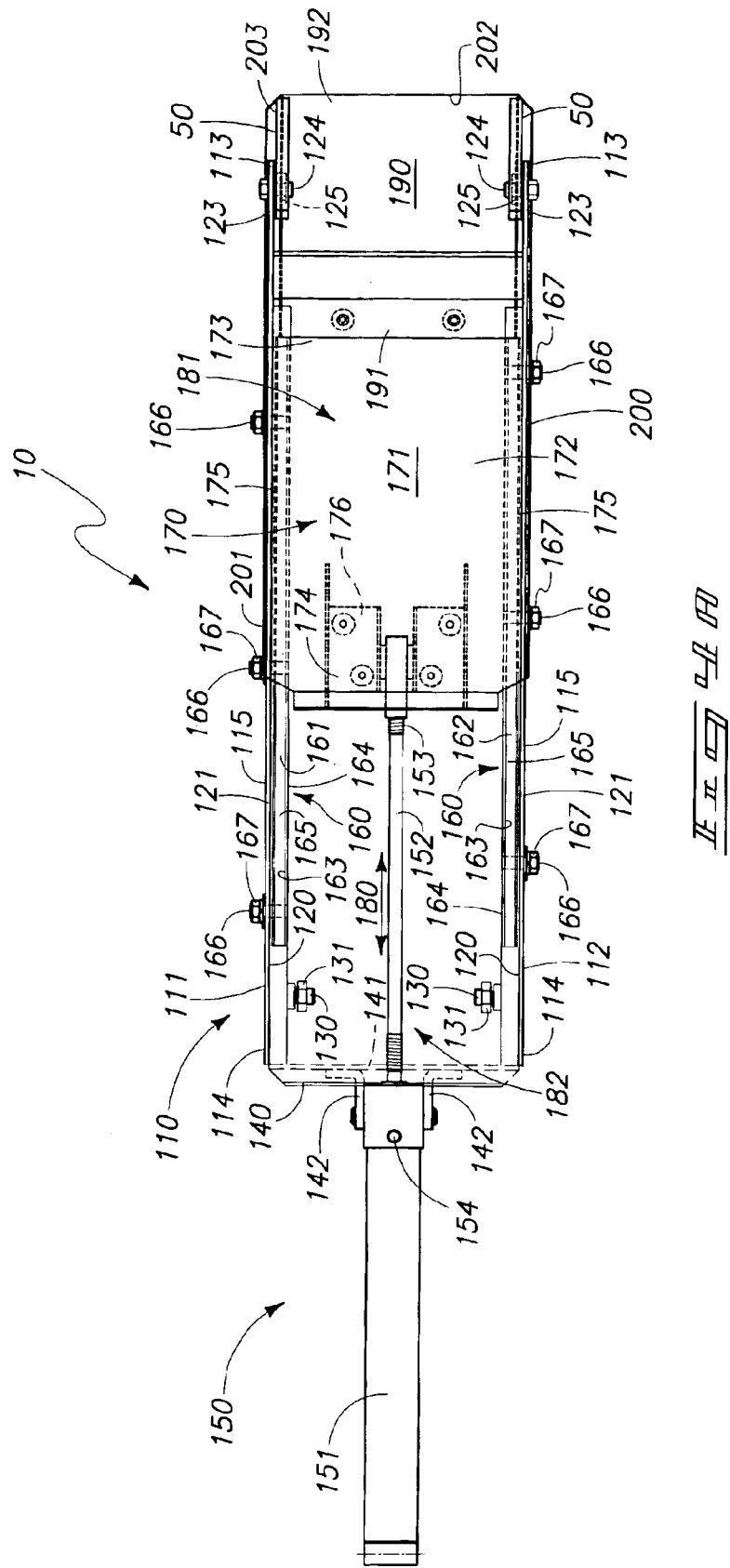

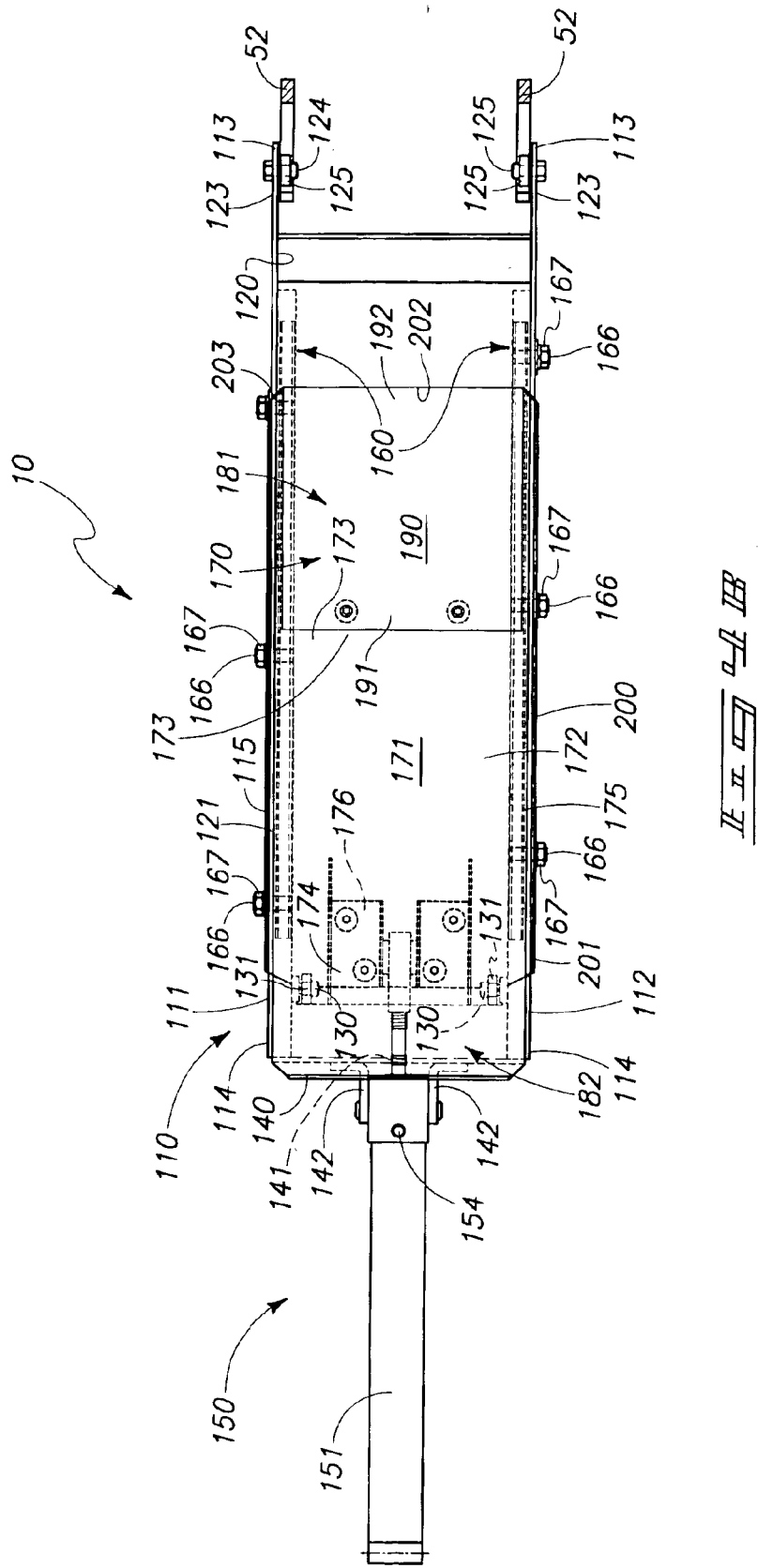

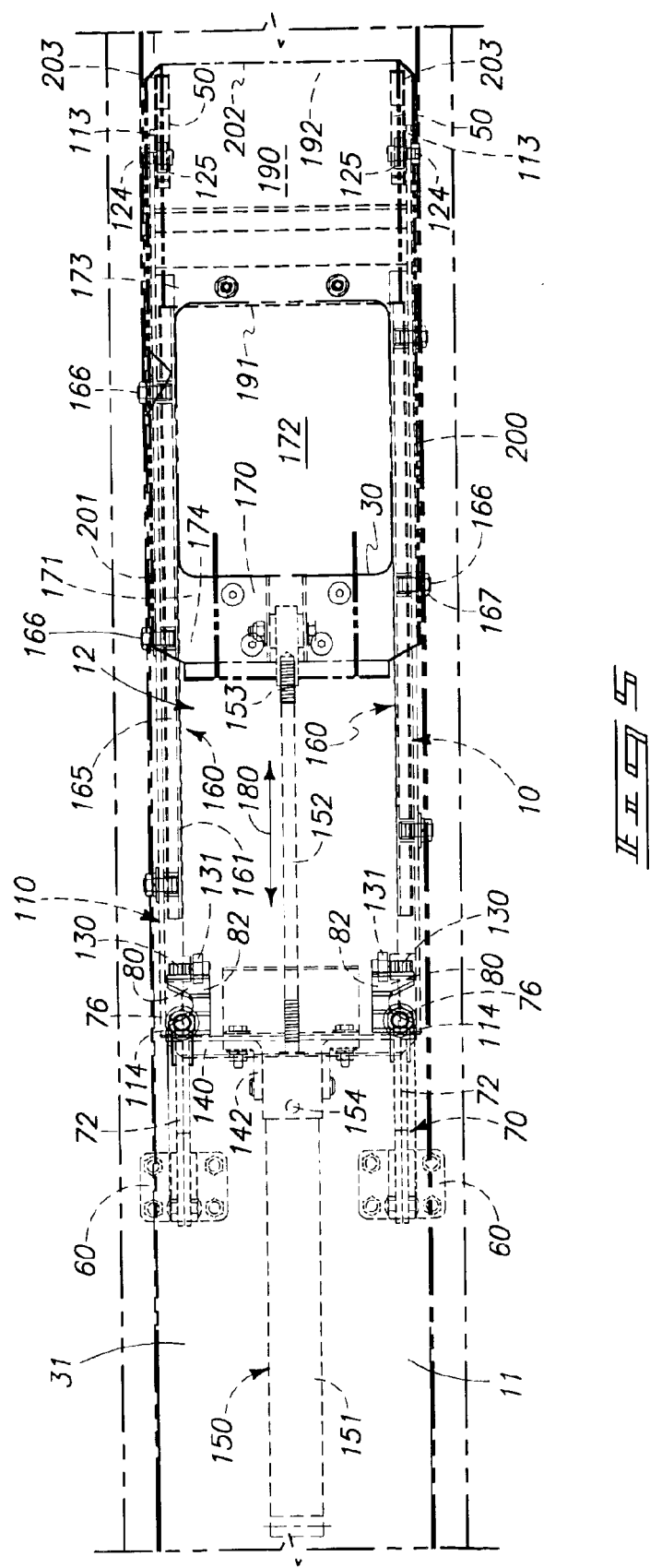

GATE ASSEMBLY

TECHNICAL FIELD

The present invention relates to a gate assembly which finds usefulness in combination with a vibratory conveyor, and more specifically to a modular gate assembly which can be readily affixed to, and then detached from the vibratory conveyor.

BACKGROUND OF THE INVENTION

The prior art is replete with scores of patents which describe various conveyor systems which are utilized to convey a product along a course of travel for various purposes.

In the processing of various food products, such as potato chips, french fries, and other lightly seasoned and or coated snack foods or frangible products, food processors have employed vibratory conveyors such as exemplified in U.S. Pat. No. 4,313,535 to move the products from one location to another. Vibratory conveyors of this general design have found wide acceptance in the food industry because conveyors of this nature carefully handle food products and minimize the damage to same while the food products are being conveyed from one work station to another.

Still further, conveyors of the nature described above have further been employed with other assemblies such as automated diverters as seen in U.S. Pat. No. 6,460,680 and which will divert a food product stream into a secondary course of travel for other processing or packaging. The teachings of U.S. Pat. Nos. 4,313,535 and 6,460,680 are incorporated by reference herein.

Gate assemblies of various designs have been employed with various conveyors for purposes of diverting streams of products along various courses of travel as discussed above. One example of a prior art gate is shown in U.S. Pat. No. 6,505,727. This patent shows a gate which selectively occludes an aperture formed in the conveyor bed. In this arrangement, the gate may be moved to a non-occluding position to allow a stream of product, acting under the influence of gravity, to fall or move therethrough so as to be directed away into another course of travel. Typically in these arrangements, another conveyor or a work station is disposed below the aperture and is operable to take the diverted product to a new processing area or to the work station. Yet further, gates have been designed for use with vibratory conveyors as seen in U.S. published application 2002/0088694 A1.

In modern food processing operations, multiple and quite different food products may be processed either simultaneously or sequentially. Consequently, food processors are concerned regarding possible contamination which might result when the fragmentary remains of a first food product finds their way into a second food product. This contamination may occur in a number of different ways. For example, if a food processor is employing a vibratory conveyor to move a frangible product such as potato chips, the operation of the conveyor as it moves the product along the conveyor may tend to produce crumbs or small fragments of the same product. In conveyors of conventional design which utilize gate assemblies of the prior art, these small fragments or crumbs may become deposited or lodged in small spaces or cracks between the conveyor and the gate. While a thorough cleaning of such areas will typically remove most food debris, some food material is either overlooked or escapes this process and is subsequently released into a later and different stream of food product when the gate is employed with that food product.

Yet further, another source of contamination from existing food debris occurs when small food fragments are released during the movement of the product along the conveyor and are able to travel or work their way through the space which normally exists between the gate and the conveyor. This food debris then contaminates the food stream moving below, and adjacent to that same conveyor.

In addition to the foregoing, and on occasion, mechanical gate assemblies fail. While typically many failures are unrelated to the food product being processed, on occasion, debris from a food product may impair the mechanical or electrical operation of a gate, such that it fails to operate properly. On these occasions, the conveyor must be disabled, and repairmen called to repair the gate so the conveyor may be placed back into operation. This of course is costly both in the sense of manpower and also in lost production time.

The present invention as described hereinafter addresses and overcomes many of the perceived shortcomings attendant with the prior art devices and practices utilized heretofore.

SUMMARY OF THE INVENTION

One aspect of the present invention is to provide a gate assembly for use with a conveying surface which has an aperture formed therein. The gate assembly includes a moveable gate plate which is operable to selectively occlude the aperture; and first and second chutes are borne by the moveable gate plate and which move therewith. The respective chutes which are individually operable to receive and carry away an article which passes through the aperture of the conveying surface.

Another aspect of the present invention relates to a gate assembly for use with a vibratory conveyor having a conveying surface and which defines an aperture, the gate assembly including a frame having opposite first and second ends and which are releasably mounted on the vibratory conveyor; a gate plate moveably borne by the frame and which is operable to selectively move from a first position, wherein the gate plate is disposed in substantially occluding relation relative to the aperture, and a second position, wherein the gate plate is located in a substantially non-occluding position relative to the aperture; an actuator mounted on the frame and disposed in force transmitting relation relative to the gate plate to move the gate plate between the first and second positions; and first and second chutes, moveably borne by the frame and further moving in unison with the gate plate as it moves between the first and second positions, the respective first and second chutes are operable to transport articles away from the vibratory conveyor and which pass through the aperture.

Yet another aspect of the present invention relates to a gate assembly for use with a vibratory conveyor and which includes a conveying surface borne by the vibratory conveyor, and which transports articles on the conveying surface along a path of travel, and wherein the conveying surface has an upwardly facing surface which supports the articles as they move along the path of travel, and which further defines an aperture through which the articles being transported may pass through under the influence of gravity, and which further has a downwardly facing surface; first and second mounting fixtures mounted on the downwardly facing surface; a frame having a first end which slideably and matingly engages the first mounting fixture, and an opposite second end; a selectively actuatable actuator borne by the frame; a gate plate slideably mounted on the frame, and wherein the actuator is operable to move the gate plate along a reciprocal path of travel between first and second positions; a latch cooperating with the downwardly facing surface of the conveying surface and which is operable to forceably act upon the second end of the frame to releasably affix the frame in an operable orientation relative to the downwardly facing surface; a first chute borne by the gate assembly and moveable in unison with the gate plate and wherein the first chute is disposed in receiving relation relative to the aperture when the gate plate is in the second position; and a second chute borne by the gate assembly, and which moves in unison with the first chute, and wherein the second chute is located in receiving relation relative to the aperture when the gate plate is located in the first position.

Yet still another aspect of the present invention relates to a gate assembly for use with a conveyor having a conveying surface which defines an aperture, the gate assembly including a modular frame which is releasably mounted on the conveyor and disposed in an operable orientation relative to the aperture; a moveable gate plate borne by the frame and operable to move along a path of travel between a first position, wherein the gate plate is disposed in substantially occluding relation relative to the aperture, and a second position, wherein the moveable gate plate is oriented in a substantially non-occluding position relative to the aperture; an actuator borne by the frame, and mounted in force transmitting relation relative to the gate plate to move the gate plate between the first and second positions; and a first chute mounted on the gate plate and moving in unison therewith, the chute operable to be selectively located in receiving relation relative to the aperture as the gate plate moves between the first and second positions.

These and other aspects of the present invention will be discussed in greater detail hereinafter.

BRIEF DESCRIPTION OF THE DRAWINGS

FIG. 4A is a plan view of the gate assembly, in a first position, and which has been removed from the conveyor apparatus.

FIG. 4B is a plan view of the gate assembly, in a second position, and which has been removed from the conveyor apparatus.

FIG. 5 is a fragmentary, plan view of the gate assembly operably mounted on a vibratory conveyor as seen in FIG. 1. Some of the gate assembly's structure is shown, in part, by phantom lines.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
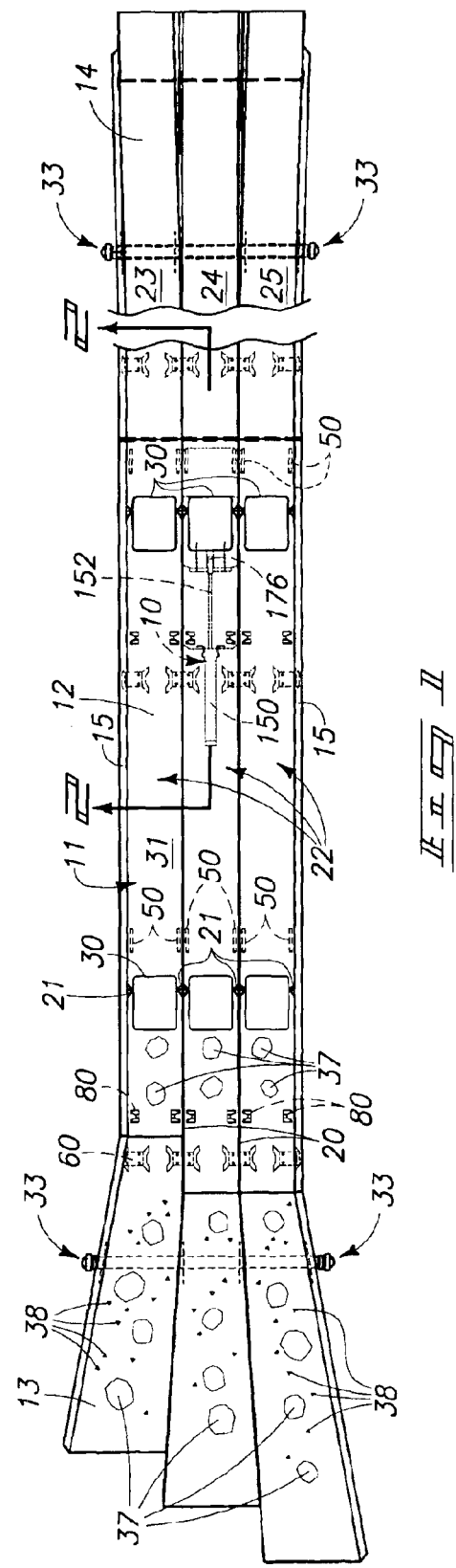
FIG. 1 is a partial, plan view of a prior art conveying apparatus upon which the present invention is utilized.

Referring now to FIG. 1 and following, it will be seen that the gate assembly of the present invention is generally indicated by the numeral 10. Referring now to FIG. 1, it will be seen that the gate assembly 10 finds usefulness on a vibratory or horizontal motion conveyor which is generally indicated by the numeral 11. The conveyor 11 has a conveying surface which is generally indicated by the numeral 12. The conveying surface 12 includes a first or intake end 13, and a second, opposite, or discharge end 14. The conveying surface 12 further includes opposite sidewalls 15 which extend generally substantially normally upwardly relative to the peripheral edge thereof. As seen in the plan view of FIG. 1, a plurality of optional lane walls 20 extend between the first intake end 13, and the opposite discharge end 14. The several optional lane walls 20 are disposed in substantially parallel spaced relation one relative to the others, and with the respective, opposite, sidewalls 15. Optional, channeling members 21 are mounted on the respective, opposite sidewalls, and on each of the several lane walls 20. The channeling members are generally oriented along a line which is transversely disposed relative to the major dimension of the conveying surface 12. The channeling members 21 function to direct product into an aperture formed in conveying surface 12. The plurality of lane walls 20, in combination with the opposite sidewalls 15, define a plurality of lanes 22 which have been designated as first, second and third lanes 23, 24 and 25, respectively. These lanes define paths of travel for a product. These several lanes permit the conveyor 11 to move several different products, or articles, simultaneously.

Figure 2:
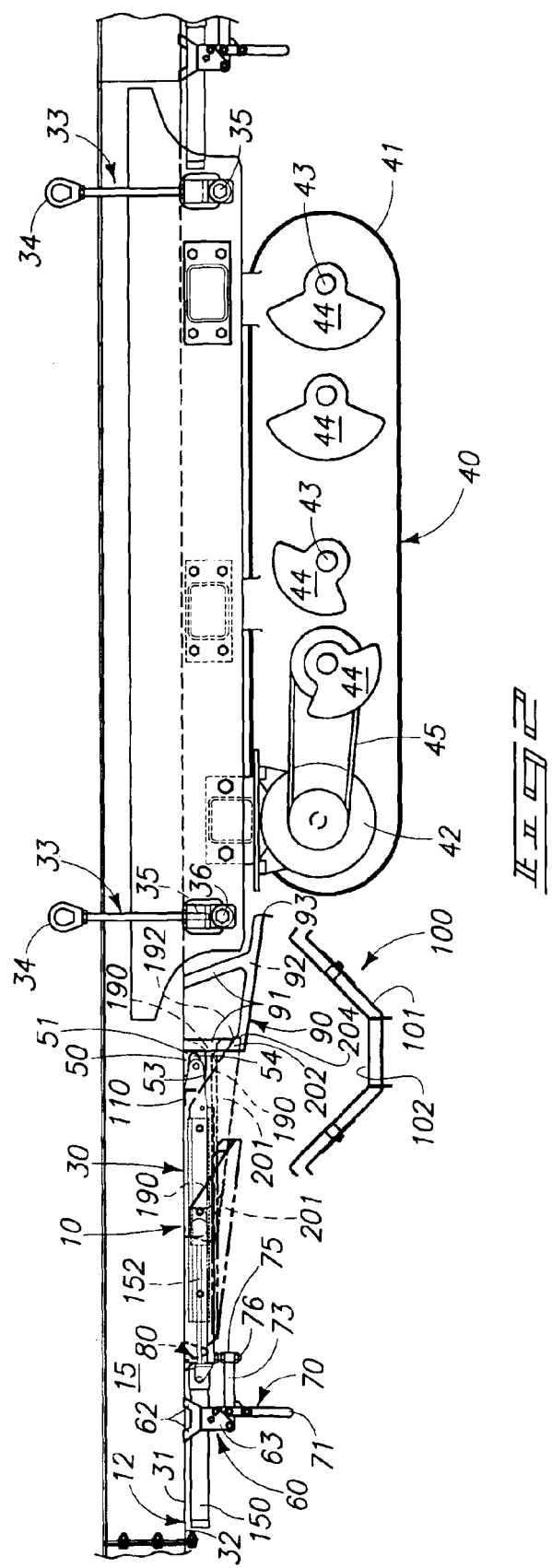
FIG. 2 is a partial, somewhat simplified and enlarged, longitudinal, vertical, sectional view taken from a position along line 2—2 of FIG. 1.

Referring still to FIG. 1, it will be seen that a plurality of apertures which are generally indicated by the numeral 30 are formed in the conveying surface 12 and extend from the top surface 31, through to the bottom surface 32 (FIG. 2). As noted in FIG. 1, the apertures are formed in predetermined positions along the several lanes 23, 24 and 25. The vibratory conveyor 11 is suspended in spaced relation relative to the surface of the earth (not shown), by a plurality of hangers which are generally indicated by the numeral 33. The hangers have a first end 34, which are individually affixed to an overhead supporting member such as a structural beam or the like; and a second end 35, which is fastened to the vibratory conveyor 11 by means of a fastener 36. The vibratory conveyor 11 is operable to convey, by means of vibratory motion, a plurality of articles such as a food product generally indicated by the numeral 37, and food debris such as crumbs and the like 38, along the top surface 31. The respective food products 37 and crumbs 38, are operable to pass through the apertures 30 under the influence of gravity, and move into other courses of travel as will be discussed in greater detail hereinafter in the event that the aperture is non-occluded.

As was discussed above, the articles 37 and 38 are moved or transported along the conveying surface 12 by means of vibratory force which is imparted to the conveying surface 12. This vibratory force is imparted to the conveying surface 12 by means of a drive assembly which is generally indicated by the numeral 40 (FIG. 2). The drive assembly 40 is mounted on the bottom surface 32, and is enclosed within a housing which is generally indicated by the numeral 41. The drive assembly as depicted in FIG. 2 is shown in greater detail in U.S. Pat. No. 6,276,518, the teachings of which are incorporated by reference herein. As a general matter however, the drive assembly 40 includes a motor 42 which may be selectively energized by means of an AC power source and a controller, (not shown). The housing 41 further includes a plurality of axels 43. Individual eccentric weights which are generally indicated by the numeral 44 are mounted in given positions and orientations along each of the respective axels. Still further, a drive belt or a drive chain 45 is mounted in force receiving relation relative to the motor 42 and is operable to transmit this same force to the respective axels. When energized, the motor 42 causes the respective axels to rotate in a given fashion in order to produce a predetermined amount of vibratory force which causes the products or articles 37 and 38 to move from the first or intake end 13 of the vibratory conveyor 11, to the second or discharge end 14.

The description which follows relates to a single gate assembly 10 such as what is depicted in FIGS. 4A and 4B. As will be appreciated by a study of FIG. 1, many gate assemblies 10 are employed with the vibratory conveyor 11. These are however, substantially identical in structure. It will be understood therefore that the following description applies to each of the gate assemblies unless the contrary is indicated.

Figure 3:
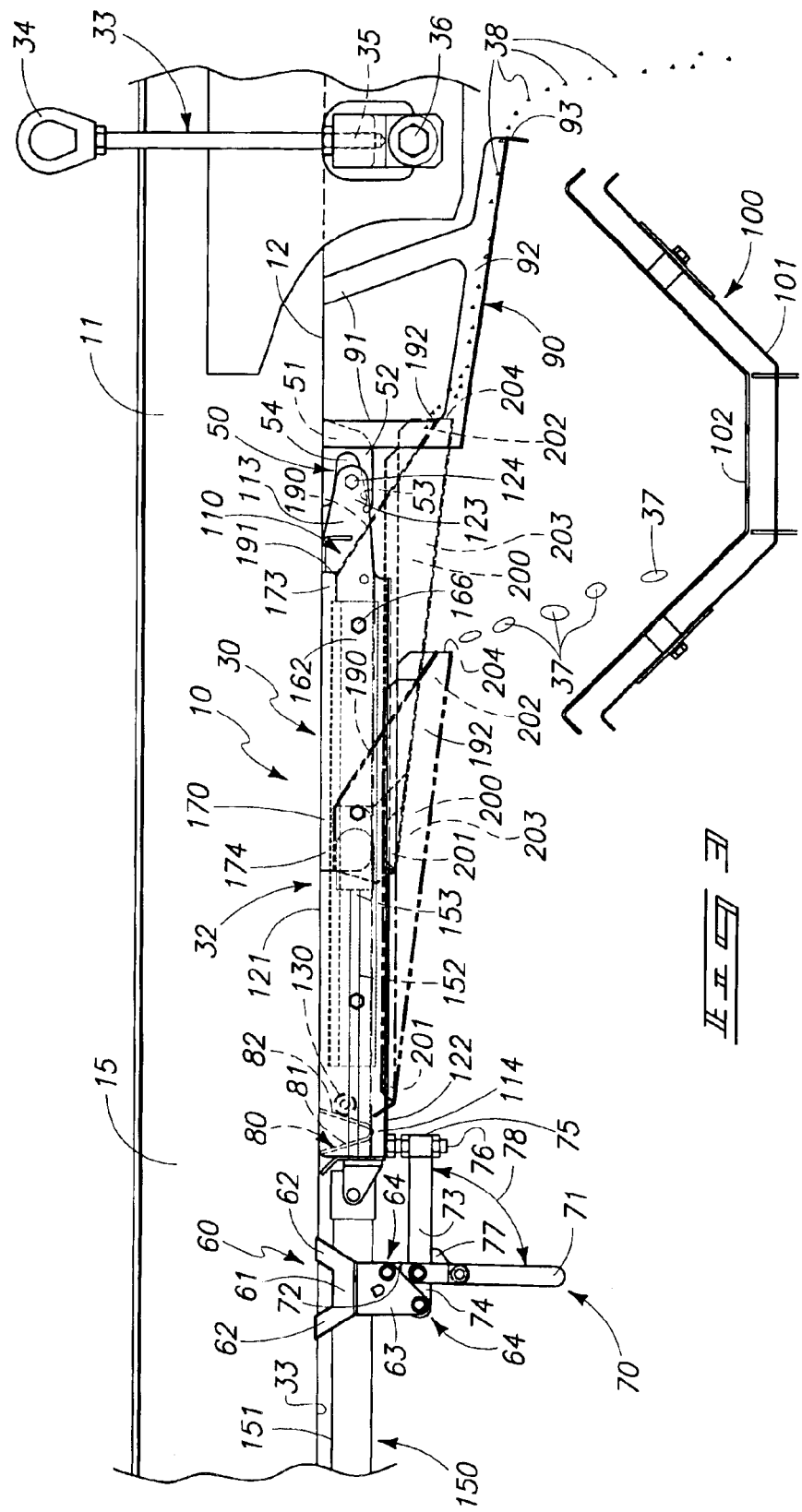
FIG. 3 is a second somewhat enlarged, fragmentary, longitudinal, vertical, sectional view taken from a position along line 2—2, and which illustrates some additional features of the present invention.

Referring now to FIG. 3, a first mounting fixture 50 is affixed in spaced relation relative to the one of the apertures 30, and on the bottom surface 32 of the vibratory conveyor 11. The first mounting fixture has a main body 51 which is fastened by welding, or other suitable fasteners to the bottom surface. The main body includes a depending portion 52. The depending portion further defines a seat 53, the function of which will be discussed below. Still further the depending portion, in combination with the main body 51, defines a diminishing somewhat angulated channel 54 which is generally oriented in a direction which extends toward the bottom surface 32 of the vibratory conveyor 11. The first mounting fixture 50 is operable, in combination with the second mounting fixture, which will be described below, to orient the gate assembly 10 in an operable orientation relative to one of the apertures 30.

Referring now to FIG. 3, it will be seen that the gate assembly 10 of the present invention includes a second mounting fixture which is generally indicated by the numeral 60. The second mounting fixture 60 has a main body 61 which is fastened by welding, or other conventional fasteners, to the bottom surface 32 of the vibratory conveyor 11. This second mounting fixture 60 is mounted in spaced relation relative to the first mounting fixture 50. Still further, the first and second mounting fixtures are oriented on the opposite sides of one of the apertures 30 which is defined by the top surface 31. The main body 61 has a plurality of legs 62 which are fastened on the bottom surface 32. The main body 61 further has a depending portion 63 which extends generally normally downwardly relative to the bottom surface 32. The depending portion 63 defines several pivot points 64.

Referring still to FIG. 3, the latch assembly 70, as illustrated, mechanically cooperates with the downwardly facing surface 32, and is further operable to forceably act upon one end of the modular frame, which will be discussed below, to releasably affix the frame and the gate assembly 10 in an operable orientation relative to the downwardly facing surface 32, and one of the apertures 30. The latch assembly 70, as illustrated, includes a handle member 71 having a distal end 72 which pivotally cooperates with one of the pivot points 64 as defined by the depending portion 63. Still further, the latch assembly 70 includes an arm member 73 which is pivotally mounted to the handle member 71, and which has a first end 74 which pivotally engages, or otherwise cooperates with one of the pivot points 64. Still further, the arm member has an opposite second end 75. A threaded adjustment member 76 is affixed to the second end 75 and is operable to forceably engage the modular frame which will be discussed hereinafter. A locking member 77 is movably mounted on the handle member 71. As should be understood, the handle member 71 allows the arm 73 to move along a substantially arcuately shaped path of travel 78 into and out of engagement with the gate assembly 10 such that the gate assembly may be easily removed from the conveyor 11, for repair, replacement, adjustment, or cleaning.

As best seen in FIG. 3, a pair of biasing guide members, which are generally indicated by the numeral 80, are fixed, in a given location, relative to the individual apertures 30, and on the bottom surface 32 of the vibratory conveyor 11. The biasing guide members each have a main body 81 which defines an angulated surface 82. This angulated surface is operable to matingly engage or cooperate with a portion of the modular frame which will be discussed in the paragraphs which follow.

Referring now to FIGS. 2 and 3, a food debris chute which is generally indicated by the numeral 90, is fixedly mounted on the bottom surface 32 of the vibratory conveyor 11, and is operable to allow food debris such as crumbs, and the like 38, to move away from the vibratory conveyor 11. The debris chute 90 is mounted on the bottom surface 32 of the vibratory conveyor 11 by a pair of depending support members which are generally indicated by the numeral 91. An angulated supporting surface 92 is affixed to each of the depending support members 91. The angulated supporting surface has a discharge end 93 which is oriented in a given location below the vibratory conveyor 11. As seen in FIGS. 2 and 3, a second conveyor 100 is provided and which is positioned below the vibratory conveyor 11. The second conveyor 100 is operable to transmit the articles 37 which pass through one of the apertures 30 in a given direction away from the vibratory conveyor 11 for purposes of further processing, handling or the like. The second conveyor 100 is of conventional design having a supporting frame 101, (shown only in part), and further having a conveying surface 102 which is moveably mounted on the supporting frame 101. The gate assembly 10 of the present invention is operable to deposit articles 37 moving under the influence of gravity through one of the apertures 30 and reliably deliver them to the second conveyor 100. These and other features of the invention 10 will be discussed below.

The gate assembly 10 of the present invention includes a modular frame which is generally indicated by the numeral 110 and which is releasably mounted on the conveyor 11, and disposed in an operable orientation relative to one of the apertures 30. As illustrated most clearly by reference to FIGS. 4A and 4B, and where the gate assembly is shown as it would appear when detached from the vibratory conveyor 11, it will be understood that the modular frame 110 includes first and second frame members 111 and 112 respectively, and which are disposed in substantially parallel spaced relation one relative to the other. Typically, the modular frame 110 is fabricated from stainless steel and the like, although it is possible that this modular frame could be constructed of other suitable rigid materials including synthetic polymers and the like. The first and second frame members each have a first end 113, and an opposite second end 114. Additionally, the respective frame members 111 and 112 each have an outside facing surface 115, and an opposite inside facing surface 120, as well as a top peripheral edge 121, and an opposite bottom peripheral edge 122 (FIG. 3). As seen most clearly by reference to FIG. 3, and when positioned in an operable orientation relative to the bottom surface 32 of the vibratory conveyor 11, the top peripheral edge 121 of the respective first and second frame members 111, and 112 are disposed in juxtaposed relation relative thereto. It will also be seen in that view that the first end 113, of the first and second frame members has a diminishing portion generally indicated by the numeral 123. The diminishing portion allows the first end 113 of the respective frame members to be wedged or otherwise matingly secured in an appropriate orientation relative to the respective first mounting fixtures 50. As illustrated most clearly by reference to FIGS. 4A and 4B, a fastener, which operates as an axel member 124 is received through the diminishing portion 123, and is operable to mount a roller or wheel assembly 125 which is operable to rollably engage the depending portion 52 which defines, in part, the diminishing channel 54. When the gate assembly 10 is deployed, the operation of the latch assembly 70 has the effect of causing the modular frame 110 to move forwardly and upwardly along the diminishing channel 54 so that the modular frame 110 can be firmly mated to the bottom surface 32 of the vibratory conveyor. This is best understood by a study of FIG. 3. It should be appreciated that the seat 53, provides a convenient area which receives and holds the wheel assembly 125 when the gate assembly 10 is either being installed or removed from the conveyor. In this regard, the first end 113 of the frame members 111 and 112, by way of the wheel assemblies 125 rest on the seat, and thereafter the second end 114 of the respective frame members are lifted into place and engaged by the latch assembly 70. When the latch assembly forceably engages the second end 114 of the respective frame members 111, and 112, the first end 113 moves along the diminishing channel 54 such that the first end 113 engages the bottom surface 32. When removing the gate assembly 10, the opposite events occur.

Referring now to FIGS. 4A and 4B, it will be seen that a second pair of fasteners 130 are mounted on the inside facing surface 120 of the respective first and second frame members 111 and 112. These respective fasteners extend substantially normally inwardly relative to the inside facing surfaces 120. The respective fasteners 130 mount individual rollers or wheels 131 which are operable to mechanically cooperate with the biasing guide members 80 (FIG. 3) which were discussed earlier in this application. The mechanical cooperation with these respective assemblies has the effect of securely positioning the modular frame 110 into an appropriate orientation relative to the bottom surface 32 and the aperture 30. As will be appreciated, when the latch 70 forceably engages the modular frame 110, the first end 113 of the frame members 111 and 112, move along the diminishing channel 54, and the rollers or wheels 131 engage the biasing guide members so as to cause this forward, and upward movement of the first end 113 of the respective frame members.

Referring still to FIGS. 4A and 4B, it will be seen that a rigid support member which is generally indicated by the numeral 140 is mounted on the respective second ends 114 of the individual first and second frame members 111 and 112. The support member 140 has a passageway 141 formed therein. Still further, a pair of mounting brackets 142 are affixed by welding, or the like, to the support member 140. The pair of mounting brackets are disposed in spaced relation, one relative to the other, and are operable to engage, and position therebetween, an actuator 150 of conventional design. The actuator may comprise a hydraulic or pneumatically actuated cylinder or any other mechanical arrangement which will produce a reciprocal force. The actuator 150 includes a cylinder portion 151 which moveably mounts a ram 152 of conventional design. The ram is reciprocally moveable, and has a distal end 153 which is threadably mated with a coupler which will be discussed in greater detail hereinafter. The cylinder portion 151 includes a fluid coupling 154 which is operable to releasably connect the cylinder portion with a suitable source of fluid under pressure (not shown), such as air, or hydraulic fluid by utilizing quick disconnect fittings (not shown).

Referring still to FIGS. 4A and 4B, the modular frame 110 includes a pair of gate plate support members which are generally indicated by the numeral 160. In this regard, the modular frame 110 includes a first support member 161, and a second support member 162, which are individually affixed on the respective first and second frame members 111 and 112, respectively. As seen in the drawings, the first and second support members 161 and 162 are affixed onto the inside facing surface 120 of the respective first and second frame members 111 and 112. The first and second support members 161 and 162 each have an inwardly facing surface 163, and an opposite outwardly facing surface 164. Still further, these same assemblies have an upwardly facing peripheral edge 165 which slideably supports a gate plate which will be discussed below. It will be seen that the first and second support members 161 and 162 have a length dimension which is less than the overall length dimension of the first and second frame members 111 and 112, respectively. Furthermore, the first and second support members have a width dimension which is less than the width dimension of the first and second frame members. As will be appreciated, therefore, the upwardly facing peripheral edge 165 is positioned inwardly, and below the top peripheral edge 121 as defined by the first and second frame members 111 and 112. The recessed position of these respective first and second support members 161 and 162 facilitates the positioning of the gate plate, which will be described below, in a recessed fashion below the top peripheral edge 121 of the respective first and second frame members 111 and 112. As best seen in FIGS. 4A and 4B, threaded shafts 166 are affixed by welding or the like on the inwardly facing surfaces 163 of the respective first and second support members. The individual threaded shafts 166 are received through apertures (not shown) which are formed in the first and second frame members 111 and 112. Fasteners 167 threadably cooperate with the respective threaded shafts thereby securing the first and second support members 161 and 162 in substantially parallel spaced relation one relative to the other, and positioning the upwardly facing peripheral edge 165 in substantially parallel, spaced relative to the top peripheral edge 121 of the first and second frame members 111 and 112, respectively.

Referring now to FIGS. 3, 4A, 4B and 5, the gate assembly of the present invention includes a gate plate 170 which is moveably borne by the modular frame 110. The gate plate 170 includes a main body 171 which defines an upwardly facing supporting surface 172, and which can be located during the operation of the gate assembly in a substantially occluding position relative to the one of the apertures 30 (FIG. 4A). The gate plate 170 is defined by a first end 173, and an opposite second end 174. Still further, the upwardly facing surface 172 is defined by substantially parallel, and laterally disposed peripheral edges 175. As can be appreciated by a study of FIGS. 4A, 4B and 5, it will be understood that the aperture 30 has a given length and width dimensions. Still further, the underlying gate plate 170 has a supporting surface 172 that has length and width dimensions which are greater than that of the aperture 30. These dimensional relationships permit the gate plate 170 to be selectively positioned in a substantially occluding relationship relative to one of the apertures 30 (FIG. 4A) such that articles 37 traveling along the conveying surface 12, may move across the upwardly facing surface 172 when the gate plate 170 is in the occluding position relative to the aperture 30. The width dimension of the gate plate 170 is measured between the laterally disposed peripheral edges 175. It will be understood by a study of FIGS. 4A and 4B, that the width dimension of the gate plate 170 is less than the distance between the first and second frame members 111 and 112. Yet further, it will be appreciated that the gate plate 170 slideably rests on the upwardly facing peripheral edge 165 of the first and second support members 161 and 162. As illustrated in FIGS. 4A and 4B, a mounting fixture or coupler 176 is suitably attached to the second end 174 of the gate plate 170. The coupler 176 is operable to threadably mate with the distal end 153 of the ram 152. As seen by a comparison of FIGS. 4A and 4B, the actuator 150 is operable to reciprocally move the gate plate 170 along a path of travel 180. The actuator is operable to selectively move the gate plate from a first position 181, wherein the gate plate 170 is disposed in substantially occluding relation relative to the aperture 30 (FIG. 4A), and to a second position 182, wherein the gate plate 170 is located in a substantially non-occluding position relative to the aperture 30 (FIG. 4B). This, of course, permits articles 37 and 38 traveling along the conveying surface 12 to move through the aperture 30 under the influence of gravity.

Referring now to FIGS. 3, 4A, 4B and 5, it will be seen that the gate assembly 10 of the present invention includes first and second chutes as will be described below and which are moveably borne by the frame 110 and which further move in unison with the gate plate 170 as it moves between the first and second positions 181 and 182. As will be described in greater detail below, the respective first and second chutes are operable to transport the articles 37 and 38 away from the vibratory conveyor 11 and which pass through the aperture 30.

The first product chute, which is generally indicated by the numeral 190, has a first or intake end 191 which is affixed by suitable fasteners to the first end 173 of the gate plate 170. Still further, this first product chute 190 includes a second or discharge end 192, which is located at an elevationally lower position than the first or intake end 191 such that the gate may receive and support articles 37 passing through the aperture 30. The articles 37 travel under the influence of gravity along the first product chute 190 between the first intake end 191 and the second discharge end 192. As will be understood, the first product chute 190 has a length and width dimension. It will be recognized by a study of FIG. 5 that the width dimension of the first product chute 190 is greater than the width dimension of the aperture 30 which is formed in the vibratory conveyor 11. As will be seen and understood by a study of FIG. 3, where the alternative positions of the chute 190 are shown, when the gate plate 170 is disposed in the second substantially non-occluding position 182 (FIG. 4B), the first product chute 190 is positioned such that articles 37 traveling along the conveying surface 12 can move through the aperture 30, and under the influence of gravity, travel along the first product chute 190 from the first end 191, to the second end 192 thereof and then fall onto the second conveyor 100. As will be appreciated from the drawings, the first product chute 190 moves in unison with the gate plate 170 as it moves along the path of travel 180.

Referring still to FIGS. 3, 4A, 4B and 5, it will be seen that the gate assembly 10 further includes a second, crumb or food debris chute which is generally indicated by the numeral 200, and which also moves in unison with the gate plate 170. In FIG. 3, it will be recognized that the second crumb chute is shown in alternative positions by means of phantom lines. The second crumb or food debris chute 200 includes a first intake end 201, and an opposite second or discharge end 202. The second chute 200 includes a supporting sidewall 203 which extends generally upwardly, and which is affixed to the gate plate such that the second chute moves in unison therewith.

It will be seen from the drawings, that the second chute 200 has a width dimension which is greater than the width dimension of the first product chute 190 such that the first product chute 190 fits between the supporting sidewalls 203. Still further, it will be seen from a study of FIG. 3 that a space, gap or passageway 204 is defined between the second or discharge end 202, and the second discharge end 192 of the first product chute 140. Yet further, the first intake end 201, is positioned immediately below the gate 170. It will be appreciated from a study of the drawings and particularly a comparison of FIGS. 4A and 4B, as well as FIG. 3, that when the gate plate 170 is disposed in the first occluding position 181 relative to the aperture 30 which is formed in the vibratory conveyor 11, that any crumbs or food debris 38 that might pass between the upwardly facing surface 172 and the conveying surface 12 will fall under the influence of gravity onto the first intake end 201, and travel along the second crumb, or food debris chute 200 such that it will be discharged at the second end 202 thereof. As seen in the drawings, when the gate plate 170 is in the first occluding position 181, the second end 202 of the second chute 200 is disposed in an orientation such that crumbs and the like which pass along its surface will be discharged onto the debris chute 90 which is mounted on the bottom surface 32 of the vibratory conveyor 11. As earlier discussed, the debris chute moves food debris away from the second conveyor 100. This of course, prevents contamination of any product traveling along the second conveyor 100. Still further, when the gate plate 170 is moved to the second substantially non-occluding position 182, the first product chute 190 is oriented to direct product or articles 37 traveling under the influence of gravity through the aperture 30 onto the second conveyor 100 which is positioned in receiving relation relative to the vibratory conveyor 11. As discussed above, the space or passageway 204 permits any food debris traveling along the second chute 200 to reach the debris chute 90 when the gate plate 170 is disposed in the substantially occluding position 181.

As earlier indicated, the gate assembly 10 is constructed in a modular arrangement which permits the gate assembly to be easily installed or removed from a conveyor 11 such as shown in FIG. 1. To install a gate assembly, an individual would lift the first end 113 of the frame members 111 and 112 into a position such that the wheel assemblies 125 which are rotatably mounted on the first end 113 rest on the seat 53. Following this, the installer would then lift the second end 114 of the respective frame members 111 and 112 up until the latch assembly 70 could engage same. Thereafter, the application of force to the latch assembly 70 causes the modular frame 110 to move forwardly and upwardly relative to the bottom surface 32 until the gate assembly 10 is located in an operable orientation relative to the aperture 30. To remove the gate assembly 10, these steps would be reversed.

OPERATION

The operation of the described embodiment of the present invention is believed to be readily apparent and is briefly summarized at this point.

Referring now to FIG. 1 and following, it will be seen that a gate assembly 10 for use with a conveying surface 12 which has an aperture 30 formed therein includes a moveable gate plate 170 which is operable to selectively occlude the aperture 30; and first and second chutes 190 and 200, respectively, which are borne by the moveable gate plate 170, and which move therewith, and which are individually operable to receive and carry away an article 37 which passes through the aperture 30, and which is defined by the conveying surface.

Referring now to FIGS. 4A and 4B, a gate assembly 10 for use with a vibratory conveyor 11 having a conveying surface 12 and which defines an aperture 30 includes a modular frame 110 having opposite first and second ends 113 and 114, and which are each releasably mounted on the vibratory conveyor. Still further, a gate plate 170 is moveably borne by the frame 110 and which is operable to selectively move from a first position 181, wherein the gate plate is disposed in substantially occluding relation relative to the aperture 30; and a second position 182, wherein the gate plate is located in a substantially non-occluding position relative to the aperture. An actuator 150 is mounted on the frame 110, and disposed in force transmitting relation relative to the gate plate 170 to move the gate plate between the first and second positions. Still further, the gate assembly 10 includes first and second chutes 190 and 200, respectively, and which are moveably borne by the frame 110, and which further move in unison with the gate plate 170 as it moves between the first and second positions 181 and 182. As earlier discussed, the first and second chutes 190 and 200 are operable to transport articles 37 away from the vibratory conveyor 11 and which pass through the aperture 30.

More specifically, the gate assembly 10 for use with a vibratory conveyor 11 include a conveying surface 12 borne by the vibratory conveyor 11, and which transports articles 37 on the conveying surface along a path of travel, which is defined by a plurality of lanes that are generally indicated by the numeral 20. The conveying surface 12 has a top or upwardly facing surface 31 which supports the articles 37 as they move along the path of travel, and further defines an aperture 30 through which the articles 37 being transported may pass through under the influence of gravity. The conveying surface 12 further has a bottom or downwardly facing surface which is generally indicated by the numeral 32. First and second mounting fixtures 50 and 60 are mounted on the downwardly facing surface 32 of the vibratory conveyor 11. A modular frame 110, having a first end 113, is operable to be slideably and releasably engaged by the first mounting fixture 50. Still further, the frame 110 has a second or opposite end 114. A selectively actuatable actuator 150 is borne by the modular frame 110. Still further, a gate plate 170 is slideably mounted on the frame 110. The actuator 150 is operable to move the gate plate 170 along a reciprocal path of travel 180 between a first position 181, and an opposite second position 182. A latch 70 cooperates with the downwardly facing surface 32 of the conveying surface 12 and is further operable to forceably act upon the second end 114 of the frame member 111, and 112 and to releasably affix the frame 110 in an operable orientation relative to the downwardly facing surface 32. As earlier discussed, the operation of the latch 70 is such as to urge the first end 113 of the modular frame along the diminishing channel 54 in order to wedge or tightly secure the first end 113 of the modular frame 110 in an operable orientation relative to the aperture 30. A first chute 190 is borne by the gate assembly 10 and moves in unison with the gate plate 170. The first chute 190 is disposed in receiving relation relative to the aperture 30 when the gate plate 170 is in the second substantially non-occluding position 182. Still further, a second chute 200 is borne by the gate assembly 10, and which moves in unison with the first chute 190. The second chute 200 is located in receiving relation relative to the aperture 30 when the gate plate is located in the first substantially occluding position 181.

Therefore the present invention discloses a gate assembly 10 for use with a conveyor 11, having a conveying surface 12 and which defines an aperture 30, and wherein the gate assembly includes a modular frame 110 which is releasably mounted on the conveyor and disposed in an operable orientation relative to the aperture 30. A moveable gate plate 170 is borne by the frame 110 and is operable to move along a path of travel 180 between a first position 181, and wherein the gate plate 170 is disposed in substantially occluding relation relative to the aperture, and a second position 182, wherein the moveable gate plate 170 is oriented in a substantially non-occluding position relative to the aperture. Still further, an actuator 150 is borne by the frame 110, and is mounted in force transmitting relation relative to the gate plate to move the gate plate 170 between the first and second positions 181 and 182. Finally, a first chute 190 is mounted on the gate plate 170, and moves in unison therewith, the chute is operable to be selectively located in receiving relation relative to the aperture 30 as the gate plate 170 moves between the first and second positions 181 and 182.

Therefore it will be seen that the present invention 10 provides many advantages over the prior art assemblies which have been utilized heretofore. The modular construction permits the operators of such vibratory conveyors to quickly remove gate assemblies when malfunction has occurred due to mechanical failure, or for other reasons. Still further, the present arrangement prevents the contamination of food products that might be occasioned by the movement of food debris through apertures formed in conveying surfaces onto underlying or adjacent conveyors or food processing stations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A gate assembly for use with a conveying surface which has an aperture formed therein, the gate assembly comprising:
   a removable frame borne by the conveying surface, and wherein the removable frame has opposite ends;
   a moveable gate plate which is operable to selectively occlude the aperture and which is movably borne by the removable frame;
   an actuator mounted on the removable frame and disposed in force transmitting relation relative to the moveable gate;
   a latch assembly which releasably mounts the removable frame in an operable orientation relative to the aperture; and
   a chute which is borne by the moveable gate plate and which moves therewith, and which is operable to receive and carry away an article which passes through the aperture of the conveying surface.

2. A gate assembly as claimed in claim 1, and wherein the conveying surface is made integral with a vibratory conveyor.

3. A gate assembly as claimed in claim 1, and wherein the conveying surface has an upwardly facing surface for transporting the articles along a path of travel, and an opposite downwardly facing surface, and wherein the frame is releasably mounted on the downwardly facing surface.

4. A gate assembly as claimed in claim 3, and wherein the frame has a first end, and an opposite second end, and wherein a first mounting fixture is mounted on the downwardly facing surface of the conveying surface, and is operable to slideably receive, and mechanically cooperate with the first end of the frame, and wherein a second mounting fixture is disposed in spaced relation relative to the first mounting fixture, and is further mounted on the downwardly facing surface, and wherein the latch assembly mechanically cooperates with the second end of the frame and is operable to releasably engage the second mounting fixture.

5. A gate assembly as claimed in claim 1, and wherein the actuator is operable to move the gate plate from a first position wherein the gate plate substantially occludes the aperture formed in the conveying surface, to a second position where the gate plate is disposed in a substantially non-occluding position relative to the aperture.

6. A gate assembly as claimed in claim 1, and wherein the gate plate is reciprocally moveable along a course of travel between a first position wherein the gate plate substantially occludes the aperture, to a second position, wherein the gate plate is disposed in a substantially non-occluding orientation relative to the aperture.

7. A gate assembly for use with a vibratory conveyor having a conveying surface which defines an aperture, the gate assembly comprising:
a frame having opposite first and second ends which are releasably mounted on the vibratory conveyor;
a gate plate moveably borne by the frame and which is operable to selectively move from a first position, wherein the gate plate is disposed in substantially occluding relation relative to the aperture, and a second position, wherein the gate plate is located in a substantially non-occluding position relative to the aperture;
an actuator mounted on the frame and disposed in force transmitting relation relative to the gate plate to move the gate plate between the first and second positions; and
first and second chutes, moveably borne by the frame and further moving in unison with the gate plate as it moves between the first and second positions, the respective first and second chutes operable to transport articles away from the vibratory conveyor and which pass through the aperture.

8. A gate assembly as claimed in claim 7, wherein the gate assembly is modular, and can be readily removed from the vibratory conveyor.

9. A gate assembly as claimed in claim 7, and further comprising:
a first mounting fixture mounted on the vibratory conveyor and which is operable to matingly receive the first end of the frame;
a second mounting fixture mounted on the vibratory conveyor; and
a latch assembly borne by the second end of the frame, and which mechanically cooperates with the second mounting fixture, and wherein the latch assembly permits the gate assembly to be releasably mounted on the vibratory conveyor.

10. A gate assembly as claimed in claim 9, and wherein the first mounting fixture defines a channel which is dimensioned to slideably receive the first end of the frame; and wherein the forceable cooperation of the latch with the second mounting fixture causes the frame to slideably move along the channel which is defined by the first mounting fixture so as to locate the gate plate in an operable orientation relative to the aperture.

11. A mounting fixture as claimed in claim 10, and wherein the conveying surface has upwardly and downwardly facing surfaces, and wherein the respective first and second mounting fixtures are mounted on the downwardly facing surface, and wherein the forceable cooperation of the second mounting fixture with the latch causes the frame to slideably move along the channel defined by the first mounting fixture, and generally in the direction of the downwardly facing surface.

12. A gate assembly as claimed in claim 7, and wherein the second chute is operable to be located in receiving relation relative to the aperture when the gate plate is located in substantially occluding relation relative to the aperture, and wherein the first chute is operable to be located in receiving relation relative to the aperture when the gate plate is oriented in substantially non-occluding relation relative to the aperture.

13. A gate assembly as claimed in claim 12, and wherein the first and second chutes are mounted on the moveable gate plate.

14. A gate assembly for use with a vibratory conveyor, comprising:
a conveying surface borne by the vibratory conveyor, and which transports articles resting on the conveying surface along a path of travel, and wherein the conveying surface has an upwardly facing surface which supports the articles as they move along the path of travel, and which further defines an aperture through which the articles being transported may pass through under the influence of gravity, and which further has a downwardly facing surface;
first and second mounting fixtures mounted on the downwardly facing surface;
a frame having a first end which slideably and matingly engages the first mounting fixture, and an opposite second end;
a selectively actuatable actuator borne by the frame;
a gate plate slideably mounted on the frame, and wherein the actuator is operable to move the gate plate along a reciprocal path of travel between first and second positions;
a latch mounted on the second mounting fixture and which is operable to engage the second end of the frame to releasably affix the frame in an operable orientation relative to the downwardly facing surface;
a first chute borne by the gate assembly and moveable in unison with the gate plate and wherein the first chute is disposed in receiving relation relative to the aperture when the gate plate is in the second position; and
a second chute borne by the gate assembly and which moves in unison with the first chute, and wherein the second chute is located in receiving relation relative to the aperture when the gate plate is located in the first position.

15. A gate assembly as claimed in claim 14, and wherein the first and second chutes are made integral with each other.

16. A gate assembly as claimed in claim 14, wherein the first and second chutes are mounted on the gate plate.

17. A gate assembly as claimed in claim 14, wherein the gate plate in the first position substantially occludes the aperture, and wherein the gate plate in the second position is oriented in a substantially non-occluding position relative to the aperture.

18. A gate assembly for use with a conveyor having a conveying surface and which defines an aperture, the gate assembly comprising:
- a modular frame which is releasably mounted on the conveyor and disposed in an operable orientation relative to the aperture;
- a moveable gate plate borne by the frame and operable to move along a path of travel between a first position, wherein the gate plate is disposed in substantially occluding relation relative to the aperture, and a second position, wherein the moveable gate plate is oriented in a substantially non-occluding position relative to the aperture;
- an actuator borne by the frame, and mounted in force transmitting relation relative to the gate plate to move the gate plate between the first and second positions; and
- a first chute mounted on the gate plate and moving in unison therewith, the chute operable to be selectively located in receiving relation relative to the aperture as the gate plate moves between the first and second positions.

19. A gate assembly as claimed in claim 18, and further comprising:
- a mounting fixture which is mounted on the conveyor, and which is releasably engageable by the modular frame to facilitate the orientation of the frame in an operable position relative to the aperture.

20. A mounting fixture as claimed in claim 18, and further comprising:
- a second chute moveably mounted on the frame and which moves in unison with the first chute, and wherein the second chute is disposed in receiving relation relative to the aperture when the gate plate is located in the first position, and wherein the first chute is located in receiving relation relative to the aperture when the gate plate is located in the second position.

21. A gate assembly as claimed in claim 18, and further comprising:
- a latch mounted on the modular frame, and which releasably affixes the modular frame on the conveyor.

22. A gate assembly for use with a conveyor having a conveying surface and which defines an aperture, the gate assembly comprising:
- a modular frame which is releasably mounted on the conveyor;
- a moveable gate plate borne by the frame and operable to move along a path of travel between a first position, wherein the gate plate is disposed in substantially occluding relation relative to the aperture, and a second position, wherein the moveable gate plate is oriented in a substantially non-occluding position;
- an actuator mounted in force transmitting relation relative to the gate plate to move the gate plate between the first and second positions; and
- a latch assembly which mechanically cooperates with the modular frame and the conveyor to releasably mount the modular frame in an operable orientation relative to the aperture.

23. A gate assembly as claimed in claim 22, and further comprising:
- a mounting fixture mounted on the conveyor and which is releasably engageable by the modular frame to facilitate the orientation of the modular frame in an operable orientation relative to the aperture.

24. A gate assembly as claimed in claim 23, and wherein the latch may be mechanically disengaged from the modular frame to permit the removal of the gate assembly from the conveyor for cleaning, repair, or replacement.

25. A gate assembly as claimed in claim 24, and further comprising:
- a chute mounted on the gate plate and moving in unison therewith, the chute is operable to be selectively located in receiving relation relative to the aperture as the gate plate moves between the first and second positions.

26. A gate assembly for use with a conveyor having a conveying surface and which defines an aperture, comprising:
- a frame having opposite first and second ends;
- a moveable gate plate borne by the frame, and selectively reciprocally moveable along a path of travel, and wherein the moveable gate can be selectively positioned in occluding and non-occluding positions relative to the aperture;
- an actuator coupled in force transmitting relation relative to the gate and which moves the gate plate along the course of travel; and
- a latch assembly for releasably mounting the frame in an operable orientation relative to the aperture.

* * * * *